United States Patent Office 3,231,412
Patented Jan. 25, 1966

3,231,412
DIEPOXIDE CONTAINING LATEX COATING FOR IMPROVING THE ADHESION OF PLURAL COATED POLYESTER FIBER TO RUBBER
Wilbur C. Pruitt and William J. Schroder, Spartanburg, S.C., assignors to Deering Milliken Research Corporation, Spartanburg, S.C., a corporation of Delaware
No Drawing. Filed July 3, 1962, Ser. No. 207,407
11 Claims. (Cl. 117—76)

This invention relates to a process for improving the adhesion of polyester fibers to rubber.

It is well known that synthetic or natural rubber cannot be satisfactorily bonded to polyester fibers without first modifying the surface of the fibers. Many methods for improving the adhesion of rubber to polyester fibers have been proposed, each of which has one or more serious deficiencies, including those procedures presently recommended for commercial production.

Of the many system known today, some of the best adhesion improvements are obtained employing flammable organic solvent systems for coating the fibers. Because the coated fibers are then subjected to high temperatures, usually employing open flame ovens, these systems have limited commercial potential. Therefore, several aqueous systems for coating the fibers have been developed.

One approach, employing an aqueous system, is the use of an epoxy modified butadiene-vinyl pyridine latex to coat the polyester fibers. According to this procedure, a coating of an epoxy modified butadiene-vinyl pyridine latex is heated on the filaments without curing catalyst to provide a soft, tacky, low-molecular weight polymer coating on the fibers. Such a coating provides relatively little improvement in adhesion, and therefore a second coating of a butadiene-vinyl pyridine latex with curing catalyst is required, which is then heated on the fibers to provide fibers with improved adhesion to rubber but which are still very tacky and extremely difficult to handle and process in subsequent commercial operations. Also, the improvement in adhesion is substantially less than could be achieved if the adhesion were as strong as the breaking strength of the filaments.

Another approach to improving the adhesion of the rubber to the polyester fibers employing an aqueous system is the use of a "RF," i.e., resorcinol-formaldehyde, modified butadiene-vinyl pyridine latex as a coating for the fibers. Such a coating is relatively free from tackiness, and the fibers thus process well and only a single coating operation is required. However, the improvement in adhesion is insufficient to permit the use of thus-coated polyester fibers in many end uses, e.g., as tire cords or industrial heavy duty belting.

It has now been found that almost perfect adhesion between polyester fibers and rubber can be achieved, i.e., adhesion values in which the delaminating forces approach the breaking strength of the fibers, by employing a two-step coating operation, the first of which employs an epoxy modified butadiene-vinyl pyridine latex and the second of which employs resorcinol-formaldehyde modified butadiene-vinyl pyridine latex. The resulting double coated fibers have excellent adhesion to rubber and are free from objectionable tackiness, thus rendering them amenable to processing in commercial operations. Also, the coating operation employs aqueous systems, thus eliminating the fire hazards associated with the use of organic solvent systems or highly flammable compounds such as the toxic isocyanates.

It is therefore an object of this invention to provide a process for improving the adhesion of polyester fibers to rubber.

It is another object to provide a process for improving the adhesion of polyester fibers to rubber employing aqueous systems.

It is still another object to provide a process for improving the adhesion of polyester fibers to rubber without imparting objectionable tackiness to the fibers.

It is a further object to provide novel coated polyester fibers having high adhesion to rubber and which are free from objectionable tackiness.

Other objects will be apparent to those skilled in the art to which this invention pertains.

According to this invention, an epoxide modified butadiene-vinyl pyridine latex is applied and "soft" cured on a polyester fiber and then a resorcinol-formaldehyde modified butadiene-vinyl pyridine latex is applied and "hard" cured on the thus-coated polyester fiber to produce a product having excellent adhesion values to rubber and good processing properties.

The term "polyester fiber" means a shaped and oriented material formed of the polyester of a polyhydroxy alcohol and a dibasic acid or one of the many modifications thereof which are now well known in the art. The most common polyester is that of ethylene glycol and terephthalic acid, e.g., those sold under the trademarks "Dacron" (E. I. du Pont de Nemours & Co.) and "Vycron" (Beaunit Mills, Inc). The fiber can be in continuous filament, multifilament or staple yarn form, twisted or untwisted, or plied into cord form, each of which can be in fabric or skrim form. This invention is primarily directed to plied cord formed of multifilament yarn, in single end, multiple-end beam, or fabric form as these materials are most frequently employed for laminating to rubber, e.g., to form V and conveyor belts and tire bodies. It also is these end uses where high rubber adhesion values are of particular importance.

It will be apparent to those skilled in the art that, while the process of this invention is directed to polyester fibers, the process will be equally applicable to other fibers, the inertness of whose external surface makes good adhesion to rubber ordinarily difficult to achieve.

The term "butadiene-vinyl pyridine latex" means the well-known latex formed of those monomers, usually in about a 70:30 ratio, i.e., somewhat less than a 1:1 molar ratio of the butadiene to vinyl pyridine. Because of the expense of the vinyl pyridine, a portion thereof is usually substituted by styrene, i.e., up to about 50% or slightly higher, e.g., to produce a 70:15:15 latex mixture.

The term "epoxide modified" means a butadiene-vinyl pyridine latex containing a polyepoxide, usually a diepoxide such as, for example, the diglycidyl ether of glycerol, of ethylene glycol or of propylene glycol, vinylcyclohexene diepoxide, or any other of the known polyepoxides. The diglycidyl ethers are the most frequently employed.

The term "resorcinol-formaldehyde modified" means a butadiene-vinyl pyridine latex containing a water-soluble resorcinol-formaldehyde resin, which resin is produced by the well-known reaction of resorcinol and formaldehyde under aqueous alkaline conditions, usually in a molar proportion of about 1:1 to 1:2 of the former to the latter, preferably about 1:1.25, or about 1 part to about 0.1 to 0.4 parts solids. The aging time of the resorcinol-formaldehyde modified latex before use is usually at least 6 hours and ordinarily one or more days to insure a resin modified latex of proper molecular weight. The exact time will depend upon the amount and activity of the selected basic catalyst, e.g., NaOH or NH$_4$OH. Excessive aging will produce an insoluble gel. It will be obvious to those skilled in the art that other polybasic phenolic type compounds can be substituted for the resorcinol to produce a resorcinol-formaldehyde type resin modified butadiene-vinyl pyridine latex.

The term "soft cured" means that the latex coating is heated under such conditions that complete polymerization does not occur, as evidenced by a more or less tacky or soft coating on the cured coated fibers. Ordinarily, this can be achieved by omitting a polymerization catalyst from the coating mixture or, if a catalyst is included, regulating catalyst concentration, curing temperatures and times such that complete polymerization is not achieved.

The term "hard cured" means that the latex coating is heated under such conditions that more complete polymerization occurs, as evidenced by a more or less hard, tack-free coating. This is readily achieved by heating an alkaline RF modified latex on the fibers, after drying, at an elevated temperature for even a relatively short period of time, e.g., two minutes or less, as such a latex on the alkaline side readily polymerizes to a tack-free coating. Such a hard cure is necessary on the final coating to provide a product which will process well in subsequent operations.

The amount of polyepoxide which should be employed in the epoxide modified butadiene-vinyl pyridine latex can be varied widely, e.g., from about 20% to 70% or more of the weight of the latex solids or from 2% to 20% of the weight of the latex dip solution is preferred. The starting latex is ordinarily diluted with water, preferably before suspending of the polyepoxide in the mixture, to provide the desired final solids content. Usually, a final solids content of about 10% to 30% provides a good coating bath.

The amount of resorcinol-formaldehyde resin which should be employed in the RF-modified butadiene-vinyl pyridine latex can also be varied considerably, e.g., from about 10–100 parts of the resin solution to 100 parts of the latex, on a solids basis, or about 10 to 30% by weight of the latex dip solution. The starting latex is usually diluted with water prior to the addition of the RF resin to provide the desired final solids content for the coating bath, e.g., about 15–40% solids.

In carrying out the process of this invention, polyester fibers in the selected form are coated with the selected epoxide-modified butadiene-vinyl pyridine latex, usually by dipping and squeezing to remove excess bath solution and evenly distribute the latex on the fibers, although padding or spraying or other techniques known in the art for applying a bath solution to fibers can also be employed, to provide a pickup of the latex preferably of about 0.5–20%, e.g., 1–10%, more preferably about 2–5%, calculated on the weight of the starting fibers and on the latex solids.

The thus-coated fibers are then dried and the coating "cured" at about 150° to 250° C., preferably about 175° to 230° C., and more preferably about 200° to 225° C., ordinarily for at least 30 seconds to 10 minutes, depending on the curing temperature, and preferably for at least 60 seconds, e.g., 1–4 minutes. A temperature close to the softening temperature of the polyester fibers is preferred. Thus, a curing temperature of at least 200° C. is ordinarily employed. An excessively high curing temperature can readily be detected by a fusing of the fibers to produce a stiff, relatively inflexible product.

The coated and cured polyester fibers are then coated with the RF-modified latex solution and again dried and cured, substantially in the manner described above for the first coating and curing operation. Because the coated fibers do not, as a rule, pick up as much of the latex solution as the uncoated fibers, the squeezing to remove excess coating bath solution can advantageously be eliminated. Alternatively or additionally, the solids content of the second bath solution can be varied to achieve the desired solids pickup, all according to procedures known in the art. A pickup of from 0.5–20%, preferably 1–10%, and more preferably about 1.5%–5%, calculated on the weight of the starting fibers and on latex solids as usually employed, with a curing temperature of about 150°–250° C., preferably 175°–230° C. and more preferably about 200°–225° C.

Adhesion of the doubly coated polyester fibers of this invention to rubber can be measured by the standard H-pull test, if the fibers are in yarn or cord form, or by the delaminating peel test when the fibers are in fabric form. In the H-pull test, a single cord is laminated into two spaced strips of rubber to form the letter H, with cord coated with a thin layer of rubber forming the bridge between the strips of cured rubber. Opposing pulling forces are then exerted on the strips of rubber to determine the force required to pull the cord from the rubber. In the delaminating peel test, the force required per inch of fabric to delaminate the rubber layer from the fabric layers is measured, e.g., on an Instron testing machine. In the process of this invention, if the selected yarn or cord has a breaking tensile strength less than about 33 pounds, which is common for cords used in belting and tires, perfect adhesion is often achieved, i.e., the cord will break before it is pulled from the cured rubber laminates.

The following examples are illustrative of the process and products of this invention but are not to be construed as limiting.

EXAMPLE I

The following mixtures are prepared:

*Composition A*

| | G. |
|---|---|
| 70:15:15 butadiene - styrene - vinyl pyridine latex, 41% solids (Gen-tac) | 125 |
| Diglycidyl ether of glycerine (Eponite 100) | 31.2 |
| Hydrocarbon sulfonate wetting agent (Petrowet R) | 1.25 |
| Water | 312 |

*Composition B*

| | |
|---|---|
| 70:15:15 butadiene - styrene - vinyl pyridine latex, 41% solids (Gen-tac) | 144 |
| Resorcinol | 45 |
| Formaldehyde (37%) | 22 |
| Water | 219 |
| Isopropyl alcohol (as wetting agent) | 5.8 |

Caustic 10% (to adjust resorcinol-formaldehyde resin to pH 9.0–9.3).

With Composition A, the diepoxide is dispersed in the mixture of the other ingredients. With Composition B, the resorcinol, formaldehyde and water are mixed for 15 minutes and then the butadiene-styrene-vinyl pyridine latex is added. The mix is aged for 96 hours before using. The isopropyl alcohol is then added to facilitate uniform wetting of the cord.

$^{2}\!/_{100}$ polyethylene terephthalate (Dacron) multifilament plied industrial cord is passed into a squeeze roll size box containing Composition A. Wet pickup is adjusted to about 18.7%, which gives a 3.3% solids pickup. The coated cord is heated at constant length in an oven at 232° C. for 96 seconds. The resulting very tacky cord is then passed for 2 seconds into a dip pan containing 96 hour old Composition B. The cord is removed from the dip pan without squeezing to provide a wet pickup of about 8.5%, which gives a 2.2% solids pickup. The coated cord is heated with very slight stretching in an oven at 232° C. for 120 seconds. The resulting cord is substantially free from any tackiness and processes well and has excellent adhesion to rubber, i.e., about 27 pounds by the H-pull test.

Any or a combination, or all of the following variations can be employed in the above procedure.

(a) The amount of diepoxide in A can be varied from about 1% to about 20% of the total weight of the mix. Typical adhesion values with such a variation are shown below.

| Diepoxide in A, percent: | Adhesion value (H-pull), lbs. |
|---|---|
| 1 | 17–20 |
| 3 | 21–23 |
| 5 | 23–25 |
| 7 | 27–29 |
| 10 | 23–25 |

(b) The curing temperatures for the first and second cures can be varied from about 150° C. to 250° C. Typical adhesion values with such a variation are shown below.

| Curing temp. of A, ° C. | Curing temp. of B, ° C. | Adhesion value (H-pull), lbs. |
|---|---|---|
| 150 | 235 | 16 |
| 175 | 235 | 21 |
| 190 | 235 | 22 |
| 205 | 235 | 26 |
| 220 | 235 | 25 |
| 230 | 235 | 27 |
| 230 | 175 | 20 |
| 230 | 190 | 20 |
| 230 | 205 | 24 |
| 230 | 220 | 28 |
| 230 | 230 | 26 |

(c) The curing time can be varied from about 30 seconds to 240 seconds at the selected temperature. Typical adhesion values with such a variation are shown below.

| Curing time of A, sec. | Curing time of B, sec. | Adhesion value (H-pull), lbs. |
|---|---|---|
| 120 | 150 | 21 |
| 96 | 120 | 26 |
| 80 | 100 | 22 |
| 68 | 86 | 22 |
| 60 | 75 | 22 |

EXAMPLE II

The procedure is followed exactly except that after aging 96 hours, 26.5 g. of a phenolic resin (Bostik EXE 126) is added to Composition B along with sufficient 30% aqueous ammonium hydroxide to adjust the pH to 9.5–10. The resulting cord has superior processing characteristics with respect to shedding of the coating in weaving and exhibits slightly greater adhesion than the cord coated according to the procedure of Example I, i.e., about 27–29 lbs. by the H-pull test.

Some, a portion of or all of the variations described above for Example I can also be employed in the coating operation of Example II with substantially the same results. The phenolic resin can also be varied from about 1% to 10%, e.g., 3 to 7%.

The following illustrates the adhesions obtained when Composition A and its curing step, Composition B and its curing step, or both are omitted from the procedure described in Examples I and II.

| Sample: | Adhesion (H-pull), lbs. |
|---|---|
| Uncoated cord | 0–4 |
| Single coated cord (Composition A) | 14–16 |
| Single coated cord (Composition B) | 10–12 |
| Double coated cord (Example I) | 27 |
| Double coated cord (Example II) | 27–29 |

What is claimed is:

1. The method of treating polyester fibers to enhance the adhesion thereof to rubber which comprises the steps of coating said fibers with a butadiene-vinyl pyridine latex containing at least one diepoxide present in quantities of from about 20% by weight to about 70% by weight based on total solids, drying and curing the latex coating on said fibers at an elevated temperature to a soft, tacky condition, and thereafter coating said fibers with an alkaline resorcinol-formaldehyde modified butadiene-vinyl pyridine latex and drying and curing the latex coating on said fibers at an elevated temperature to a hard, tack-free condition.

2. A method according to claim 1 wherein the polyester fiber is an ethylene glycol terephthalic acid polyester.

3. A method according to claim 2 wherein the polyester is in multifilament, plied cord form.

4. A method according to claim 1 wherein the diepoxide is a diglycidyl ether of glycerine modified latex.

5. The method of treating an ethylene glycol terephthalic acid polyester fiber in multifilament plied yarn form to improve its adhesion to rubber which comprises the steps of coating said fibers with about 0.5–20% of a butadiene-vinyl pyridine latex containing at least one diepoxide present in quantities of from about 20% by weight to about 70% by weight based on total solids, drying and curing the latex coating to a soft, tacky condition at a temperature from about 150°–250° C., and thereafter coating said fibers with an alkaline resorcinol-formaldehyde modified butadiene-vinyl pyridine latex and drying and curing the latex coating to a hard, tack-free condition at a temperature from about 150°–250° C., the percentages being calculated on the weight of the starting fibers and the latex solids.

6. The method of treating an ethylene glycol terephthalic acid polyester fiber in multifilament plied yarn form to improve its adhesion to rubber which comprises the steps of coating said fibers with about 1–10% calculated on the weight of the starting yarn and the latex solids of a diglycidyl ether of glycerol butadiene-vinyl pyridine latex, said diglycidyl ether of glycerol being present in quantities of from about 20% by weight to about 70% by weight based on total solids, drying and curing the latex coating to a soft, tacky condition at a temperature from about 150°–250° C. and thereafter coating said fibers with an alkaline resorcinol-formaldehyde modified butadiene-vinyl pyridine latex and drying and curing the latex coating to a hard, tack-free condition at a temperature from about 175° C.–230° C.

7. A method according to claim 6 wherein the butadiene-vinyl pyridine latex is a butadiene-styrene-vinyl pyridine latex in about 70:15:15 proportion.

8. Polyester fibers coated with an in situ cured reaction product of butadiene-vinyl pyridine latex and at least one diepoxide, said diepoxide being present in quantities of from about 20% by weight to about 70% by weight, based on total reaction product solids, said reaction product having superimposed thereon an alkaline resorcinol-formaldehyde modified butadiene-vinyl pyridine latex coating.

9. The product of claim 8 wherein said polyester is an ethylene glycol terephthalic acid polyester.

10. The product of claim 8 wherein the diepoxide is a diglycidyl ether of glycerine modified latex.

11. The product of claim 8 wherein the butadiene-vinyl pyridine latex is a butadiene-styrene-vinyl pyridine latex in about 70:15:15 proportion.

References Cited by the Examiner

UNITED STATES PATENTS

| 2,886,473 | 5/1959 | Schroeder | 117—161 |
| 2,898,664 | 8/1959 | Salem | 117—7 |
| 2,938,823 | 5/1960 | Salem | 117—7 |
| 2,990,313 | 6/1961 | Knowles et al. | 161—253 |
| 2,994,671 | 8/1961 | Thompson | 117—7 |
| 3,027,337 | 3/1962 | Tritsch | 117—162 |
| 3,028,903 | 4/1962 | Lessig | 117—162 |
| 3,050,820 | 8/1962 | Pamm | 117—7 |

RICHARD D. NEVIUS, *Primary Examiner.*